United States Patent
Yue et al.

(10) Patent No.: US 9,524,126 B2
(45) Date of Patent: Dec. 20, 2016

(54) METHODS AND SYSTEM FOR PRINTING DEVICE SERVICE RESTART

(71) Applicant: KYOCERA Document Solutions Inc., Osaka (JP)

(72) Inventors: Tommy Yue, Concord, CA (US); Olga Dillard, Concord, CA (US); Keisuke Fukushima, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/612,808

(22) Filed: Feb. 3, 2015

(65) Prior Publication Data
US 2016/0224281 A1    Aug. 4, 2016

(51) Int. Cl.
*G06F 3/12*  (2006.01)
*H04L 12/24* (2006.01)
*G06K 15/00* (2006.01)

(52) U.S. Cl.
CPC ........... *G06F 3/1205* (2013.01); *G06F 3/1236* (2013.01); *G06K 15/4045* (2013.01); *H04L 41/0806* (2013.01)

(58) Field of Classification Search
USPC .................................. 358/1.15, 1.1, 1.9, 1.14
See application file for complete search history.

(56) References Cited

U.S. PATENT DOCUMENTS

| | | | |
|---|---|---|---|
| 2004/0128368 A1* | 7/2004 | Sakai | H04L 29/06 709/220 |
| 2007/0055675 A1* | 3/2007 | Oosawa | G06F 21/10 |
| 2009/0225350 A1* | 9/2009 | Carney | G06K 15/02 358/1.15 |
| 2013/0088749 A1* | 4/2013 | Park | H04L 12/12 358/1.15 |

* cited by examiner

*Primary Examiner* — Jerome Grant, II
(74) *Attorney, Agent, or Firm* — McDonnell Boehnen Hulbert Berghoff LLP

(57) ABSTRACT

Example systems and methods may relate to performing a service restart on a printing device. A method preferably includes receiving a setting modification for a printing device, and storing the setting modification in an entity database. The method then includes receiving, at a network manager, an indication of the setting modification. The method further includes determining, by the network manager, responsive to receiving the indication of the setting modification, whether a network restart is required. The method yet further includes upon determining that the network restart is not required, determining, by a protocol manager, based on the setting modification stored in the entity database, a service requiring a restart. The method then includes initiating a restart of the determined service.

18 Claims, 6 Drawing Sheets

METHODS AND SYSTEM FOR PRINTING DEVICE SERVICE RESTART

BACKGROUND

1. Field of the Invention

Unless otherwise indicated herein, the description in this background section is not prior art to the claims in this application and is not admitted to be prior art by inclusion in this section. The present disclosure relates to methods and systems for performing a restart of a printing device service without performing a network restart.

2. Description of the Related Art

Modern printing devices are becoming increasingly complex as a result of added functions, applications, and services. For example, many printing devices can connect to multiple users over multiple network interfaces, and can run a variety of applications and services.

During the operation of these devices, a user often wishes to change or modify one or more settings. Traditionally, a setting change required the printing device to restart. Restarting the device caused any active network connections to be interrupted, and any pending print jobs to be disrupted. Thus, a user seeking to change a setting would have to either disrupt all active connections, or wait until all printing jobs were completed before restarting the device to complete the setting change.

As a result of this problem, a need exists for a system and method for restarting one or more selected services running on a printing device, without performing a network restart.

SUMMARY

In a first aspect, a method is provided. The method preferably includes receiving a setting modification for a printing device. The method then includes storing the setting modification in an entity database. The method further includes receiving, at a network manager, an indication of the setting modification. The method also includes determining, by the network manager, responsive to receiving the indication of the setting modification, whether a network restart is required. The method yet further includes upon determining that the network restart is not required, determining, by a protocol manager, based on the setting modification stored in the entity database, a service requiring a restart. The method then includes initiating a restart of the determined service.

In a second aspect, a printing device is provided. The printing device preferably includes a control unit receiving a setting modification for storage in an entity database. The printing device also includes a network manager receiving an indication of the setting modification, and determining whether a network restart is required responsive to receiving the indication of the setting modification. The printing device further includes a protocol manager determining, based on the setting modification stored in the entity database, a service requiring a restart. The printing device yet further includes a system state manager initiating the restart of the determined service.

In a third aspect, a method is provided. The method preferably includes determining that a setting modification for a printing device is requested. The method also includes determining whether a network restart is required. The method additionally includes determining that a service running on the printing device requires a restart. The method yet further includes restarting the determined service, without restarting the network.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims, are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

This disclosure relates to devices and methods for performing a restart of one or more printing device services without performing a network restart. Specifically, a method may include receiving a setting modification for a printing device. Examples of setting modifications may include a modification to the printer settings (e.g., host name), a modification to the printing device's internet protocol (IP) filter settings, or a modification to a setting related to a specific service running on the printing device (e.g., AirPrint settings), as well as others. Once the setting modification is received, the method may include storing the setting modification in an entity database. Then, the method may include receiving, at a network manager, an indication of the setting modification. The network manager may then determine, responsive to receiving the indication of the setting modification, whether a network restart is required in order to carry out the setting change. Upon determining that a network restart is not required, the method may include a protocol manager determining, based on the setting modification stored in the entity database, a service requiring a restart. This may include the protocol manager comparing the setting modification stored in the entity database to a set of initial start-up settings stored locally by the protocol manager. The method may then include initiating a restart of the determined service.

II. Device Examples

Figure 1:
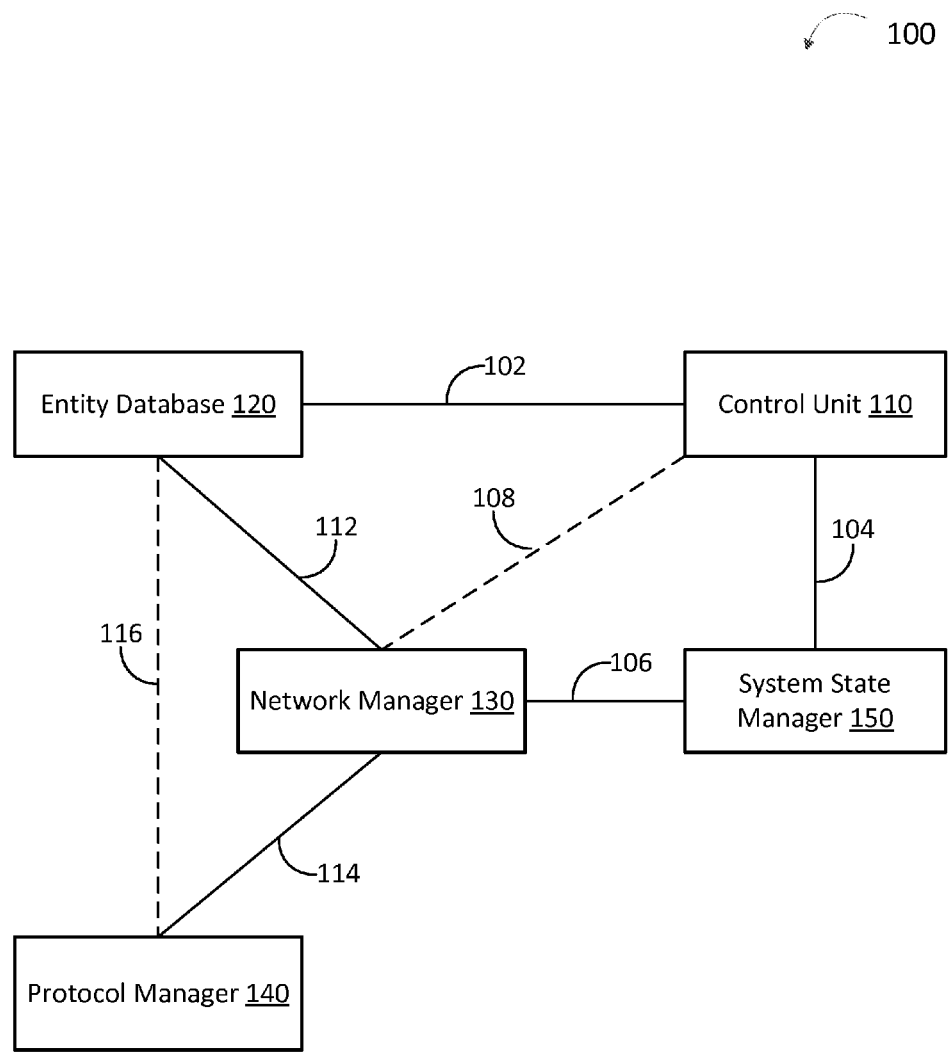
FIG. 1 is a block diagram illustrating a printing device according to an embodiment of the present disclosure.

FIG. 1 is a block diagram illustrating a printing device 100 according to an example embodiment. The printing device 100 may include a control unit 110, an entity database 120, a network manager 130, a protocol manager 140, and a system state manager 150. The components of the printing device 100 may be connected with each other and/or with other components, devices, or systems via one or more communication paths. For example, a communication path 102 may connect the control unit 110 to the entity database 120, a communication path 104 may connect the control unit 110 to the system state manager 150, a communication path 106 may connect the system state manager 150 to the network manager 130, a communication path 108 may connect the control unit 110 to the network manager 130, a communication path 112 may connect the network manager 130 to the entity database 120, a communication path 114 may connect the network manager 130 to the protocol manager 140, and a communication path 116 may connect the protocol manager 140 to the entity database 120. Each communication path may traverse a communication network.

In the following descriptions of the various components, the term "data storage" may be used. The data storage may take many different forms such as a hard disk drive (HDD), compact disc (CD), digital video disc (DVD), digital tape, or non-volatile flash memory such as a flash drive, secure digital (SD) card, or other storage mediums. The data storage may also be any form of volatile memory, including random access memory (RAM), for example. Further, the data storage may be integrated with one or more of the described components, may be shared between one or more components (i.e., an internal memory for the entire device), or may be separate from the described components.

In addition, the following descriptions may use the term "setting modification." Setting modification may refer to a modification of one or more of the device settings (e.g., host name or AirPrint settings), general settings (e.g., local area network (LAN) settings), transmission control protocol/internet protocol (TCP/IP) settings (e.g., IPv4, IPv6, IPsec, dynamic DNS, Bonjour, IP filter, or logical printer settings), manager settings (e.g., simple network management protocol (SNMP), or protocol settings (e.g., certificate, IEEE 802.1X, simple object access protocol (SOAP), line printer daemon protocol (LPD), line printer remote protocol (LPR), link layer topology discovery protocol (LLTD), or hypertext transfer protocol (HTTP) settings).

a. Control Unit

The control unit 110 in the printing device 100 may be implemented as a computing device, such as the computing device described in more detail below with respect to FIG. 3. The control unit 110 may be configured for performing various operations, including, for example, receiving a setting modification. In one example, the control unit 110 may receive the setting modification via a communication interface. For instance, the control unit 110 may include an embedded web server that can communicate with one or more devices via one or more communication paths. A user wishing to modify the settings of the printing device 100 may input the setting modification using a remote device, which in turn may communicate the setting modification to the control unit 110 via a wired or wireless communication path (not shown).

In another example, the control unit 110 may receive the setting modification via an integrated or stand-alone user interface, which may include a keyboard, display screen, mouse, touch screen, haptic feedback system and/or other interactive element. A user may input a setting modification directly to the control unit 110 via the user interface.

The control unit 110 in the printing device 100 may also be configured to transmit the setting modification to an entity database 120. In one example, the control unit 110 may transmit the setting modification via communication path 102. The transmission may take any appropriate form, such as a packet stream, bit stream or other data transfer mechanism, for example.

The control unit 110 in the printing device 100 may also be configured to transmit an indication of the setting modification to a network manager 130. The indication may be the setting modification itself, a network restart request, a service restart request, a flag value, or any other indicative signal, for example. The transmission of the indication may also take any appropriate form, such as a packet stream, bit stream, or other data transfer mechanism, for example. In one example, the control unit 110 may transmit a "network setting changed" event using a proxy via an appropriate communication path.

In some examples, the indication may be transmitted by the control unit 110 to the network manager 130 via the system state manager 150. In this case, the indication may first be transmitted to the system state manager 150 via the communication path 104. The indication may then be transmitted by the system state manager 150 to the network manager 130 via the communication path 106.

In an alternative example, the control unit 110 may transmit the indication directly to the network manager 130 via an optional communication path 108. Other paths or connections may be used as well, including those through intermediate components (as well as paths not explicitly shown in FIG. 1).

b. Entity Database

The entity database 120 in the printing device 100 may be implemented as a stand-alone component, or integrated with one or more other components described in this disclosure. For example, the entity database 120 may be implemented as all or part of a computing device similar or identical to the computing device described in more detail below with respect to FIG. 3, including a data storage, processor, user interface, and/or communication interface.

In some examples, the entity database 120 may be configured to receive a setting modification from the control unit 110 via communication path 102. The setting modification may be stored by the entity database 120 in a data storage as a bit stream, and may be organized in a list, table, array, or other organizational construct.

The entity database 120 may also be configured to store network and/or setting configurations of the printing device 100. For example, the entity database 120 may store and keep track of the current network configuration, as well as one or more of the device settings (e.g., host name or AirPrint settings), general settings (e.g., local area network (LAN) settings), transmission control protocol/internet protocol (TCP/IP) settings (e.g., IPv4, IPv6, IPsec, dynamic DNS, Bonjour, IP filter, or logical printer settings), manager settings (e.g., simple network management protocol (SNMP), and/or protocol settings (e.g., certificate, IEEE 802.1X, simple object access protocol (SOAP), line printer daemon protocol (LPD), line printer remote protocol (LPR), link layer topology discovery protocol (LLTD), or hypertext transfer protocol (HTTP) settings).

The entity database 120 may also be configured to communicate with the network manager 130 and the protocol manager 140 via communication paths 112 and 116 respectively.

c. Network Manager

The network manager 130 in the printing device 100 may be implemented as a stand-alone component, or integrated with one or more other components described in this disclosure. For example, the network manager 130 may be implemented as all or part of a computing device similar or identical to the computing device described in more detail below with respect to FIG. 3, including a data storage, processor, user interface, and/or communication interface. As another example, the network manager 130 may share a processor, communication interface, and/or data storage with one or more other components described in this disclosure.

In one example embodiment, the network manager 130 may include, in a data storage, a list, database, array, or other storage structure containing network configurations and/or settings (i.e., network configuration parameters) that require the printing device 100 to perform a network restart. In addition or alternatively, the data storage may include network configuration parameters that, if modified, would require the printing device 100 to perform a network restart.

The network manager 130 may be configured to receive an indication of a setting modification from the control unit 110 via communication path 108. In another example, the network manager 130 may be configured to receive the indication from the control unit 110 via communication paths 104 and 106, where the system state manager 150 acts as an intermediary.

The network manager 130 may also be configured to determine whether a network restart is required. The network manager 130 may communicate with the entity database 120 to determine whether the stored setting modification affects any network configuration parameters stored by the network manager 130 (i.e., whether the setting modification changes any relevant network configuration or setting). If the stored setting modification does affect any of the stored network configuration parameters, then a network restart may be required. For example, one scenario may proceed as follows: (1) the setting modification is a change to the host name of the printing device, (2) the changed host name is stored in the entity database 120, (3) the control unit 110 transmits an indication of the setting modification to the network manager 130, (4) the network manager 130 communicates with the entity database 120 to determine that the host name is being modified, and (5) the network manager 130 determines that the host name change affects one or more of the stored network configuration parameters, and thus a network restart is required.

As an alternative example, the setting modification may be a modification to an AirPrint setting (i.e., a setting that does not affect any network configuration parameter). An example scenario may proceed as follows: (1) the setting modification is a change to the AirPrint settings, (2) the modified AirPrint setting is stored in the entity database 120, (3) the control unit 110 transmits an indication of the setting modification to the network manager 130, (4) the network manager 130 communicates with the entity database 120 to determine that the AirPrint settings are being modified, and (5) the network manager 130 determines that the AirPrint setting change does not affect any stored network configuration parameter, and thus a network restart is not required.

The network manager 130 may also be configured to notify the system state manager 150 that a network restart is or is not required, based on the earlier determination.

In addition, the network manager 130 may be configured to communicate with the protocol manager 140. Where a network restart is not required, the network manager 130 may communicate with the protocol manager 140 to determine which, if any, services must be restarted. The network manager 130 may then be configured to notify the system state manager 150 which service or services must be restarted.

d. Protocol Manager

The protocol manager 140 in the printing device 100 may be implemented as a stand-alone component, or integrated with one or more other components described in this disclosure. For example, the protocol manager 140 may be implemented as all or part of a computing device similar or identical to the computing device described in more detail below with respect to FIG. 3, including a data storage, processor, user interface, and/or communication interface. As another example, the protocol manager 140 may share a processor, communication interface, and/or data storage with one or more other components described in this disclosure.

In one example, the protocol manager 140 may include one or more lists, tables, databases, arrays, or other storage structures containing the initial start-up settings for each service running on the printing device 100. The protocol manager 140 may also include initial network and/or protocol settings for the printing device 100, in addition to the service settings.

The protocol manager 140 may be configured to determine if one or more services need to be restarted. The protocol manager 140 may communicate with the entity database 120, and compare the setting modification stored in the entity database 120 to the initial settings stored in the protocol manager 140. Where there is a difference, the protocol manager 140 may determine that a restart of the one or more services is required.

In another example, the protocol manager 150 may determine one or more services that must be restarted based on the initial start-up settings, network settings, and/or protocol settings. Further, the determination may be based, at least in part, on the network configuration parameters stored by the network manager 130 and/or entity database.

The protocol manager 140 may also be configured to notify the network manager 130 via communication path 114 which service or services must be restarted. The network manager 130 may then notify the system state manager 150 via communication path 106 which service or services were determined by the protocol manager 140.

e. System State Manager

The system state manager 150 in the printing device 100 may be implemented as a stand-alone component, or integrated with one or more other components described in this disclosure. For example, the system state manager 150 may be implemented as all or part of a computing device similar or identical to the computing device described in more detail below with respect to FIG. 3, including a data storage, processor, user interface, and/or communication interface. As another example, the system state manager 150 may share a processor, communication interface, and/or data storage with one or more other components described in this disclosure. The system state manager 150 may be configured to perform one or more acts, including, for example, initiating a network restart and/or one or more service restarts.

In one example, the system state manager 150 may be configured to receive, from the network manager 130, an indication of one or more services that must be restarted. For instance, the protocol manager 140 may determine that the AirPrint settings are being modified, and indicate to the network manager 130 that the AirPrint service must be restarted. The network manager 130 may then notify the system state manager 150 that the AirPrint service must be restarted.

The system state manager 150 may also be configured to initiate a restart of one or more services running on the printing device 100. In one example, the system state manager 150 may initiate a restart of a service by transmitting a "service restart" event to another component of the printing device 100, such as the network manager 130, for example. The "service restart" event may be a command in the form of a bit stream, packet stream, or other data transfer mechanism, which, when executed, causes one or more services to be restarted. Other forms are possible as well.

III. System Examples

Figure 2:
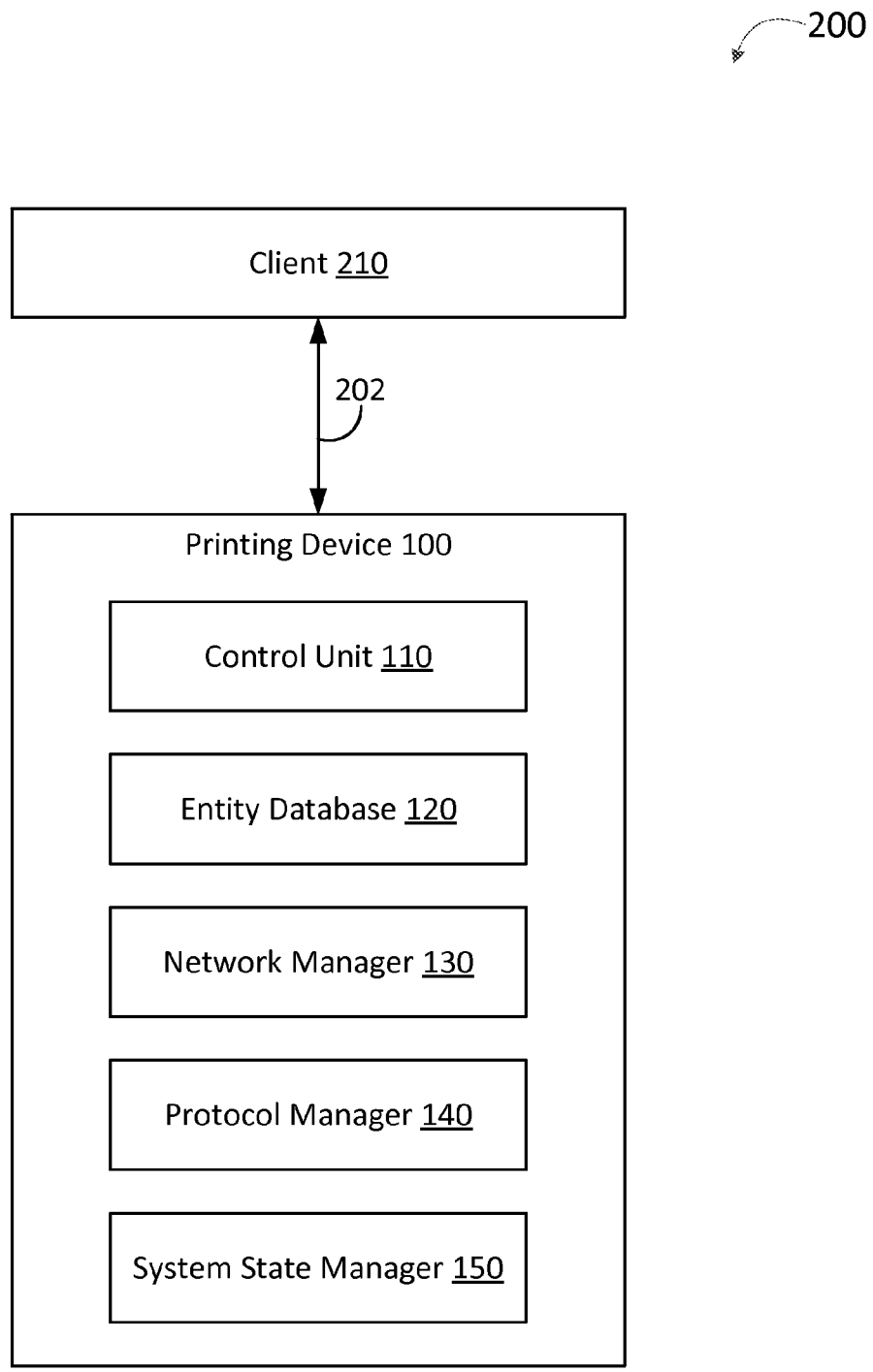
FIG. 2 is a block diagram illustrating an example system according to an embodiment of the present disclosure.

FIG. 2 is an example system according to an embodiment of the present disclosure. The system 200 may include a client 210 and a printing device 100. The printing device 100 may include a control unit 110, an entity database 120, a network manager 130, a protocol manager 140, and a system state manager 150. The client 210 and the printing device 100 may be connected by a communication path 202, which may traverse a communication network. One or more of the components of system 200 may be similar or identical to the components described with reference to FIG. 1.

Figure 3:
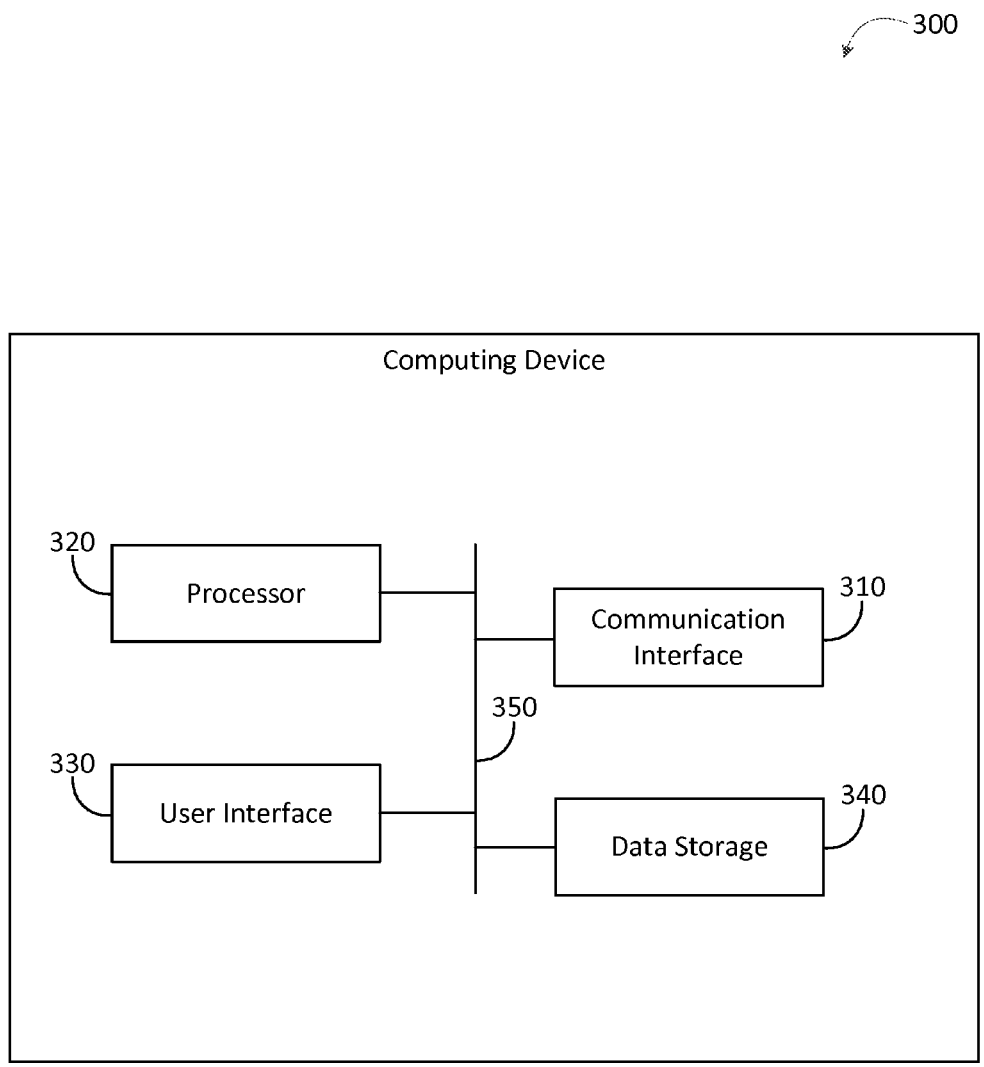
FIG. 3 is a block diagram illustrating an example computing device according to an embodiment of the present disclosure.

In one example, the client 210 in the system 200 may be implemented on a computing device, such as the computing device described in more detail with respect to FIG. 3, and may take the form of a web-based application. An example application is the Command Center RX provided by Kyocera Document Solutions America of Fairfield, N.J. The client may include a web browser operating on the computing device, such as Microsoft Internet Explorer, Mozilla Firefox, Google Chrome, or Apple Safari, for example. The client may include a set of instructions that, when executed, allows a user to input a setting modification, and causes the input setting modification to be transmitted to the printing device 100 via communication path 202. Communication path 202 may be a wired or wireless connection, such as an Ethernet, universal serial bus (USB), or Wi Fi connection, for example.

As an example, a user may wish to modify an AirPrint setting on a given printing device. The user may access the client 210 using a personal computer connected to the printing device via a Wi Fi connection. The user may input the setting modification using a web browser operating on the personal computer. The setting modification may then be transmitted to the printing device 100 via communication path 202.

In another example, the client 210 may be integrated with the printing device 100. The client 210 may be an application running on the printing device 100, and/or may be optionally integrated with one or more components of the printing device 100, such as the control unit 110, for example. In this case, a user wishing to modify a setting of a printing device 100 having an integrated client 210 may access the client 210 using the printing device 100, via a user interface of the printing device 100. The user may input a setting modification using the client 210, which may then transmit the setting modification to one or more other components of the printing device via one or more communication paths.

IV. Computing Device Examples

FIG. 3 is a block diagram illustrating an example computing device 300. The computing device 300 may be configured for performing a variety of functions or acts, such as those described in this disclosure (including the accompanying drawings). The computing device 300 may include various components, including for example, one or more communication interfaces 310, processors 320, user interfaces 330, and data storages 340. The components of the computing device 300 may be communicatively connected to each other (or other devices or systems) via a system bus, network, or other connection mechanism 350.

The communication interface 310 in the computing device 300 may be configured to allow the computing device 300 to communicate with one or more devices (or systems) according to one or more protocols. In one example, the communication interface 310 may be a wired interface, such as an Ethernet interface or a USB interface. As another example, the communication interface 310 may be a wireless interface, such as a cellular or Wi Fi interface, for example. Other example communication interfaces may include a fiber-optic link, coaxial cable, Bluetooth, ZigBee, WiMAX, wireless wide-area network (WWAN), and/or other similar type of interface.

The processor 320 in the computing device 300 may include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). The processor 320 may be configured to execute computer-readable program instructions contained in the data storage 340, and/or other instructions as described herein.

The user interface 330 in the computing device 300 may facilitate interaction with a user of the computing device, if applicable. As such, the user interface 330 may include input components such as a keyboard, keypad, computer mouse, trackball, joystick, camera, microphone, voice recognition module, and touch sensitive panel, and output components such as a display screen (which, for example, may be combined with a touch sensitive panel), sound speaker, and haptic feedback system.

The data storage 340 in the computing device 300 may include one or more volatile, non-volatile, removable, and/or non-removable storage components, such as magnetic, optical, or flash storage, and may be integrated in whole or in part with the processor 320. Further, the data storage 340 may take the form of a non-transitory computer-readable storage medium, having stored thereon program instructions (e.g., compiled or non-compiled program logic and/or machine code) that, when executed by the processor 320, cause the computing device 300 to perform one or more functions or acts, such as those described in this disclosure. Such program instructions may define or be part of a discrete software application that can be executed in response to certain inputs received from the user interface 330, for instance. The data storage 340 may also store other types of information or data, such as those types described throughout this disclosure (e.g., network, service, or other printing device settings).

V. Method Examples

Figure 4:
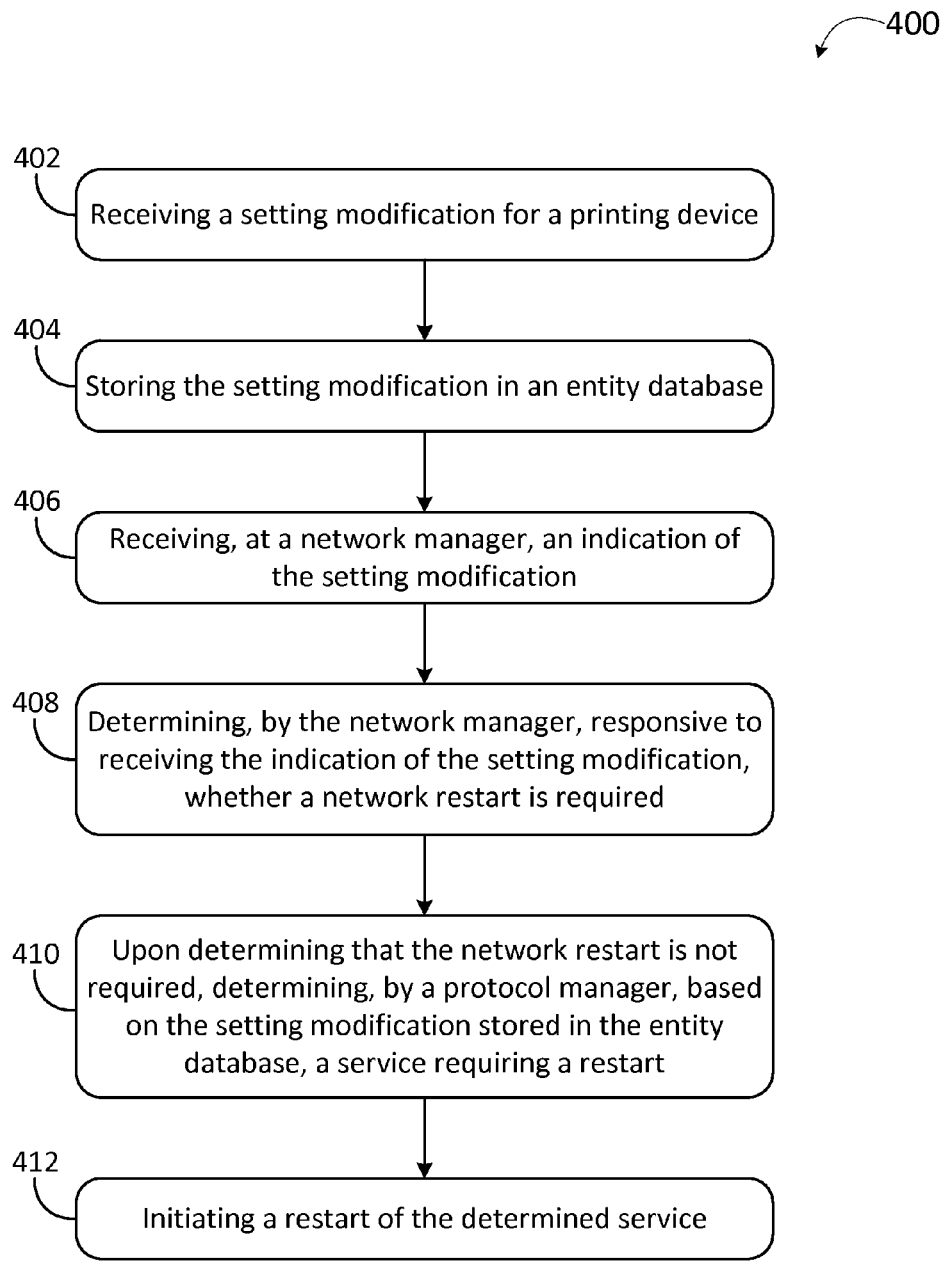
FIG. 4 is a flow chart illustrating an example method according to an embodiment of the present disclosure.

FIG. 4 is a flow chart illustrating an example method 400, according to an embodiment of the present disclosure. Method 400 is a method for performing a service restart, which can be carried out by one or more of the components described herein with reference to FIGS. 1-3.

The method 400 may begin at block 402, which includes receiving a setting modification for a printing device. In one embodiment, the setting modification may be received by a control unit via input from a user interface. For example, the setting modification may be input using a keyboard, keypad, computer mouse, trackball, joystick, camera, microphone, voice recognition module, and/or touch sensitive panel. In another embodiment, the setting modification may be received by the control unit via a communication interface. For example, a user may input a setting modification using an application running on a personal computer (e.g., client 210), which may then transmit the setting modification to the printing device via a wired or wireless communication path.

The setting modification may be one or more modifications to the device settings, general settings, TCP/IP settings, or protocol settings, for example, as described above in relation to FIG. 1. Other setting modifications are possible as well.

At block 404, the method 400 may include storing the setting modification in an entity database. The setting modification may be stored in a table, array, database, or other storage structure along with other network, service, and/or device settings and configurations.

At block 406, the method 400 may include receiving, at a network manager, an indication of the setting modification. The indication may take any of several forms, including for example, the setting modification itself, a network restart request, a service restart request, a flag value, or any other indicative signal. The indication of the setting modification may notify the network manager that a setting modification has been requested, either by a user or by one or more devices or systems included in (or connected to) the printing device. The network manager may receive the indication from one or more of the components described with reference to FIG. 1, such as the control unit 110 or the system state manager 150, for example.

At block 408, the method 400 may include determining, by the network manager, responsive to receiving the indication of the setting modification, whether a network restart is required. In one example, the network manager may include a table, list, array, or other organizational construct containing network configurations and/or network settings which, if modified, require a network restart. To determine whether a network restart is currently required, the network manager may compare the list to the network configuration and/or settings stored in the entity database. The network manager may determine, based on whether there is a difference in one or more network configuration parameters, whether a network restart is required.

In another example, the network manager may compare the list of network configurations and/or settings to the indication of the setting modification. Based on this comparison, the network manager may determine whether a network restart is required. In yet another example, the network manager may determine whether a network restart is required solely based on the indication of the setting modification. For instance, the indication of the setting modification may include information such as which specific setting has been modified, which may allow the network manager to determine whether a network restart is required. Other methods of making the determination are possible as well.

At block 410, the method 400 may include upon determining that the network restart is not required, determining, by a protocol manager, based on the setting modification stored in the entity database, a service requiring a restart. The protocol manager may include a table, list, array, or other organizational construct containing the initial start-up settings for each service operating on the printing device. To determine which service or services require a restart, block 410 may include the protocol manager comparing the start-up settings to the setting modification stored in the entity database. The protocol manager may determine that a given service must be restarted if there is a difference for that service.

In another example, the protocol manager may determine, based solely on the setting modification stored in the entity database, whether one or more service settings have changed. The protocol manager may then determine one or more services that must be restarted based on the changed service settings.

At block 412, the method 400 may include initiating a restart of the determined service. In one example, the system state manager may initiate a restart of the one or more services determined by the protocol manager in step 410.

Figure 5:
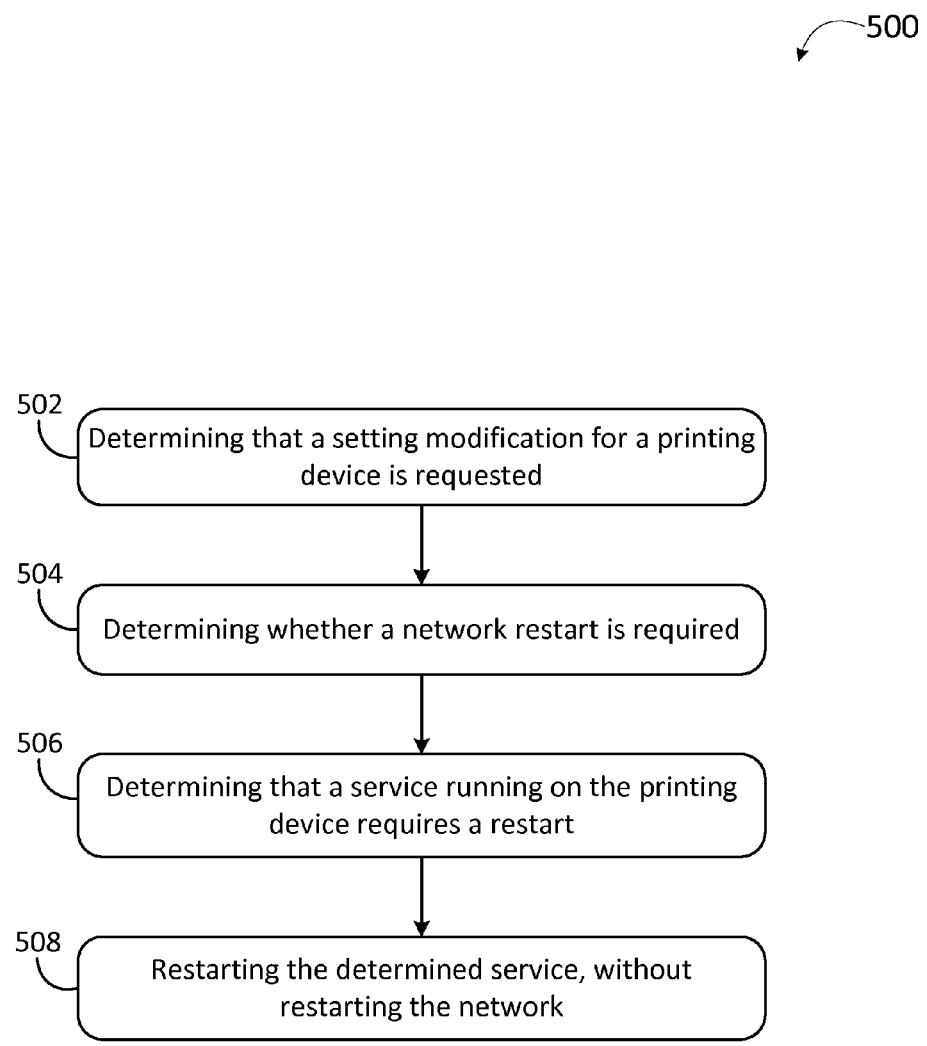
FIG. 5 is a flow chart illustrating an example method according to an embodiment of the present disclosure.

FIG. 5 is a flow chart illustrating an example method 500, according to an embodiment of the present disclosure. Method 500 is a method for performing a service restart, which can be carried out by one or more of the components described herein with reference to FIGS. 1-3.

At block 502, the method 500 may include determining that a setting modification for a printing device is requested. In one example, this act may include the printing device receiving a setting modification via a user interface or communication interface as described above with reference to block 402 of FIG. 4. In another example, determining that a setting modification is requested may include receiving an indication that a setting modification is requested. The indication may be a network restart request, a service restart request, a flag value, or any other indicative signal. This determination may be performed by one or more of the components described above with reference to FIGS. 1-3 (e.g., the control unit 110).

At block 504, the method 500 may include determining whether a network restart is required. In one example, block 504 may include the network manager comparing a set of network configurations and/or settings stored locally by the network manager to a network configuration and/or settings stored in the entity database. This comparison may be performed in response to receiving an indication that a setting modification has been requested. In another example, block 504 may include the network manager receiving an indication that a network setting has been changed, and determining based on the received indication that a network restart is required. For example, the indication may include information such as which setting specifically has been changed, which may be used to determine whether a network restart is required.

At block 506, the method 500 may include determining that a service running on the printing device requires a restart. In one example, block 506 may include the protocol manager having a table, list, array, or other organizational construct containing the initial start-up settings for each service running on the printing device. Block 506 may then include the protocol manager comparing the start-up settings to the settings stored in the entity database (including the setting modification). The protocol manager may determine that a given service running on the printing device must be restarted if there is a difference in settings for that service. In another example, the protocol manager may receive an indication of the setting modification, which may include data corresponding to which setting specifically has been modified. The protocol manager may then determine, based on the indication and the initial start-up settings, one or more services that must be restarted.

At block 508, the method 500 may include restarting the determined service, without restarting the network. In one example, block 508 may include the system state manager initiating a restart of the determined service. The initiation may include the system state manager transmitting a "notify service restart" event to the network manager. In another example, one or more other components may transmit one or more other signals or commands configured to cause the determined service to restart.

VI. Other Examples

Figure 6:
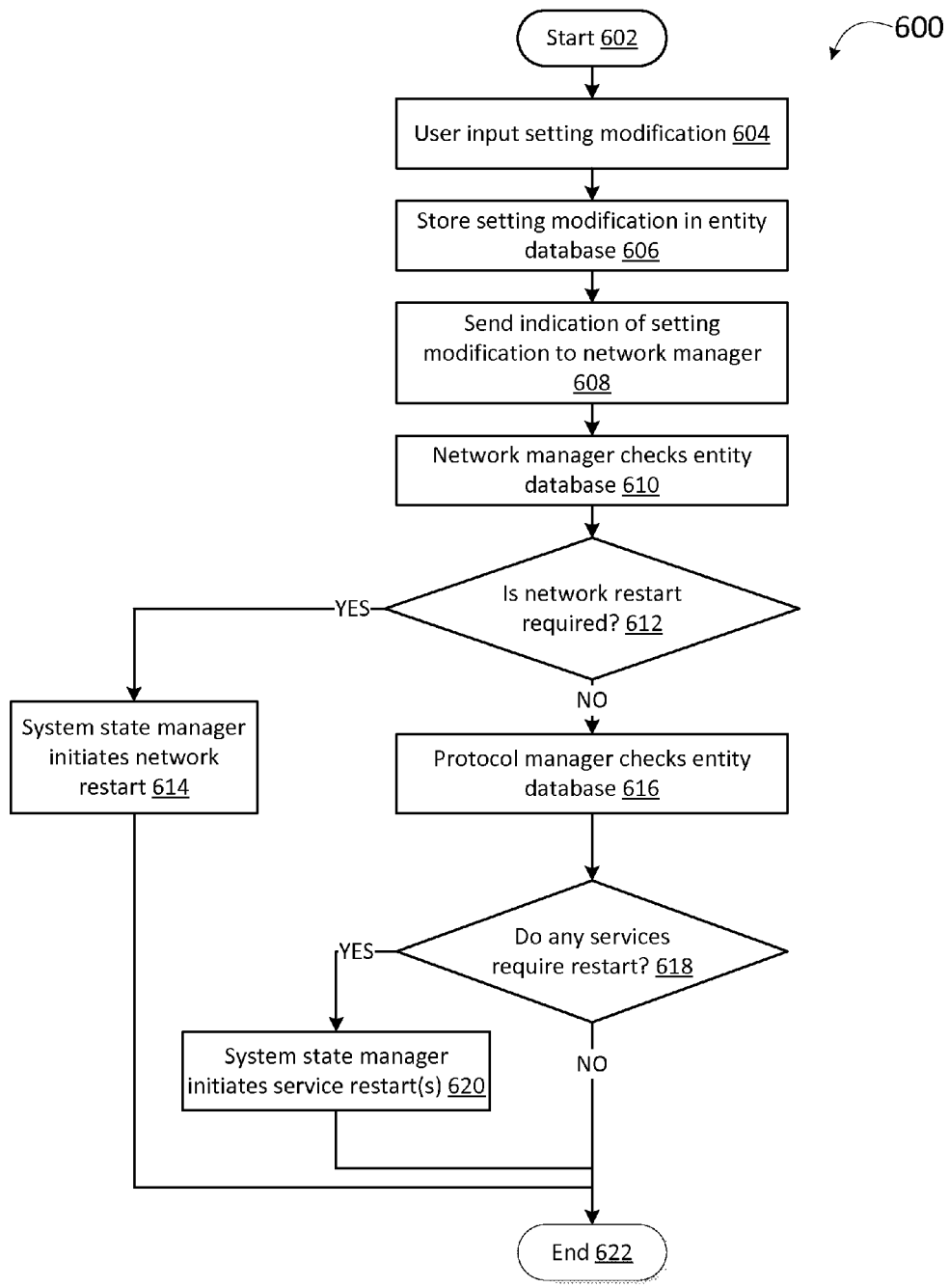
FIG. 6 is a flow chart illustrating an example process according to an embodiment of the present disclosure.

FIG. 6 is a flow chart illustrating an example process 600 according to an embodiment of the present disclosure. Process 600 may start at block 602. At block 604, the process 600 may include a user inputting a setting modification. This may be done through a user interface or communication interface such as those described above in this disclosure.

At block 606, the process 600 may include storing the setting modification in an entity database. Block 608 may include sending an indication of the setting modification to the network manager. The indication may be a network or service restart request, or any form of indication described in this disclosure, for example.

At block 610, the process 600 may include the network manager checking the entity database. The network manager may transmit a request or other signal to the entity database via a communication path requesting information or data related to the network configuration and/or settings stored in the entity database.

At block 612, the process 600 may include determining if a network restart is required. A network restart is required where it is necessary to update certain settings that affect the printing device. For example, a network restart may be required where the setting modification changes the printing device host name, LAN settings, or IPv4/IPv6 settings.

If a network restart is required, then the process 600 may next include block 614, where the system state manager initiates a network restart. Block 614 may include the system state manager sending a "notify network restart" event to the network manager. The process 600 may then end at block 622.

Alternatively, if a network restart is not required at block 612, then the process 600 may include block 616, in which the protocol manager checks the entity database. The protocol manager may transmit a request or other signal to the entity database via a communication path requesting information or data related to settings stored in the entity database.

At block 618, the process 600 may include determining whether any services require a restart. A service restart may be required where a given service's settings have been affected by the setting modification. For example, a service restart may be required where the setting modification changes the AirPrint settings, Bonjour settings, or IP filter settings, for example.

If a service restart is required at block 618, then the process 600 may next include block 620, in which the system state manager initiates a service restart of one or more services. Block 620 may include the system state manager sending a "notify service restart" event to the network manager. The process 600 may then end at block 622.

Alternatively, if a service restart is not required at block 618, the process 600 may end at block 622.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving a setting modification for a printing device;
storing the setting modification in an entity database;
receiving, at a network manager, an indication of the setting modification;
determining, by the network manager, responsive to receiving the indication of the setting modification, whether a network restart is required;
upon determining that the network restart is not required, determining, by a protocol manager, based on the setting modification stored in the entity database, a service requiring a restart; and
initiating a restart of the determined service,
wherein the protocol manager determines that a service requires a restart based on a comparison of the setting modification stored in the entity database to a table of initial settings in the protocol manager.

2. The method of claim 1, wherein the setting modification for the printing device is received by a web server.

3. The method of claim 1, wherein the setting modification is a modification of one or more of a (i) printer setting, (ii) TCP/IP setting, (iii) manager setting, or (iv) protocol setting.

4. The method of claim 1, wherein the network manager determines whether the network restart is required based on a difference in a network configuration parameter.

5. The method of claim 1, wherein the protocol manager determines, based on the setting modification stored in the entity database, a plurality of services requiring restart, and a restart of the plurality of determined services is initiated.

6. The method claim 1, wherein initiating the restart of the determined service further comprises a system state manager initiating the restart.

7. The method of claim 6, wherein the system state manager initiates the restart of the determined service by transmitting a service restart event to the network manager.

8. A printing device comprising:
a control unit receiving a setting modification, and storing the setting modification in an entity database;
a network manager receiving an indication of the setting modification and determining whether a network restart is required responsive to receiving the indication of the setting modification;
a protocol manager determining, based on the setting modification stored in the entity database, a service requiring a restart; and
a system state manager initiating the restart of the determined service,
wherein the protocol manager determines that a service requires a restart based on a comparison of the setting modification stored in the entity database to a table of initial settings in the protocol manager.

9. The printing device of claim 8, wherein the control unit is a web server.

10. The printing device of claim 8, wherein the protocol manager determines, based on the setting modification stored in the entity database, a service requiring a restart and the system state manager initiates the restart of the determined service only when the network manager determines that a network restart is not required.

11. The printing device of claim 8, wherein the setting modification is a modification of one or more of a (i) printer setting, (ii) TCP/IP setting, (iii) manager setting, or (iv) protocol setting.

12. The printing device of claim 8, wherein the network manager determines whether the network restart is required based on a difference in a network configuration parameter.

13. The printing device of claim 8, wherein the protocol manager determines, based on the setting modification stored in the entity database, a plurality of services requiring restart; and the system state manager initiates the restart of the determined plurality of services.

14. A method comprising:
determining that a setting modification for a printing device is requested;
determining whether a network restart is required;
determining that a service running on the printing device requires a restart; and
restarting the determined service, without restarting the network,
wherein determining that a service running on the printing device requires a restart comprises determining that a service running on the printing device requires a restart based on a comparison of the requested setting modification to a table of initial settings.

15. The method of claim 14, wherein the setting modification for the printing device is requested via a web server.

16. The method of claim 14, wherein the setting modification is a modification of one or more of a (i) printer setting, (ii) TCP/IP setting, (iii) manager setting, or (iv) protocol setting.

17. The method of claim 14, wherein determining whether a network restart is required comprises determining whether a network restart is required based on a difference in a network configuration parameter.

18. The method of claim 14, wherein determining that the service running on the printing device requires a restart and restarting the determined service, without restarting the network comprise determining a plurality of services requiring restart, and restarting the plurality of services without restarting the network.

* * * * *